Nov. 27, 1956 W. A. BRATFISCH ET AL 2,771,906
FLUID FILLING SYSTEM
Filed March 18, 1952 2 Sheets-Sheet 2
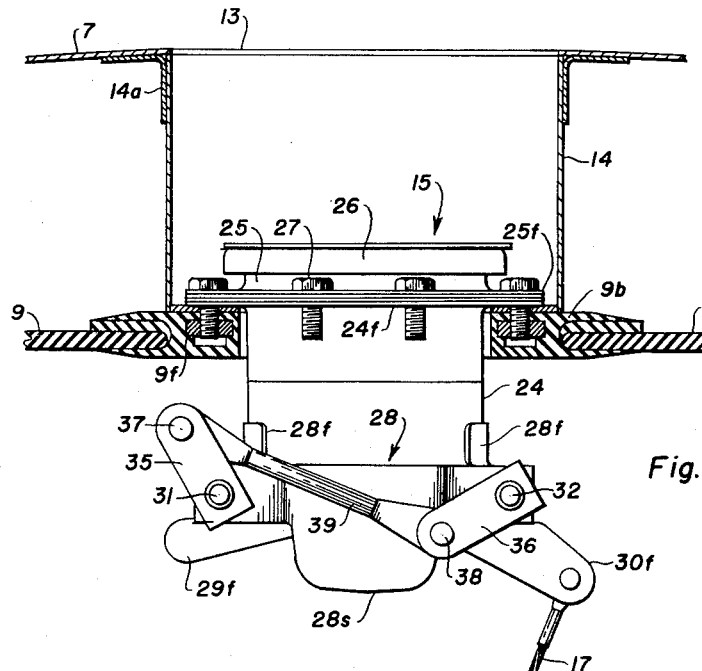
Fig. 3
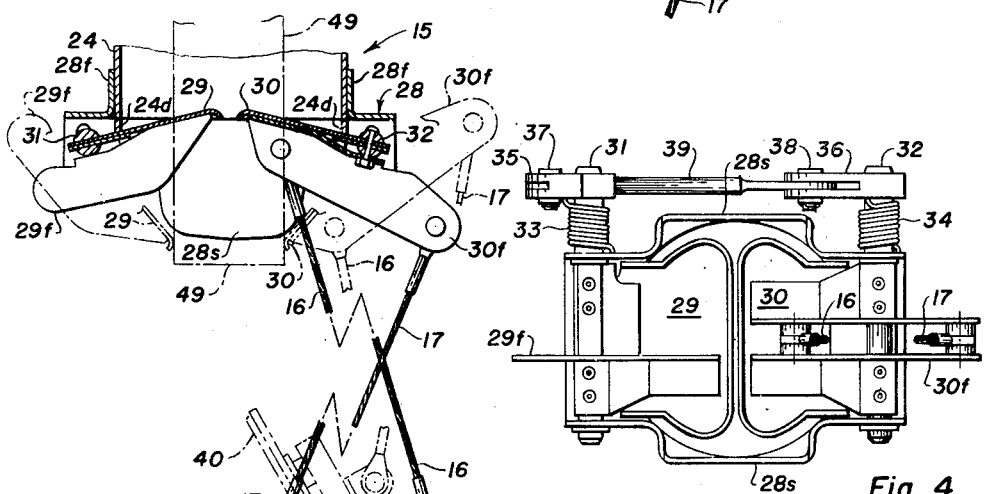
Fig. 2
Fig. 4
Warren A. Bratfisch
& Philip H. Jones
INVENTORS.
BY *James M. Clark*
THEIR PATENT ATTORNEY.

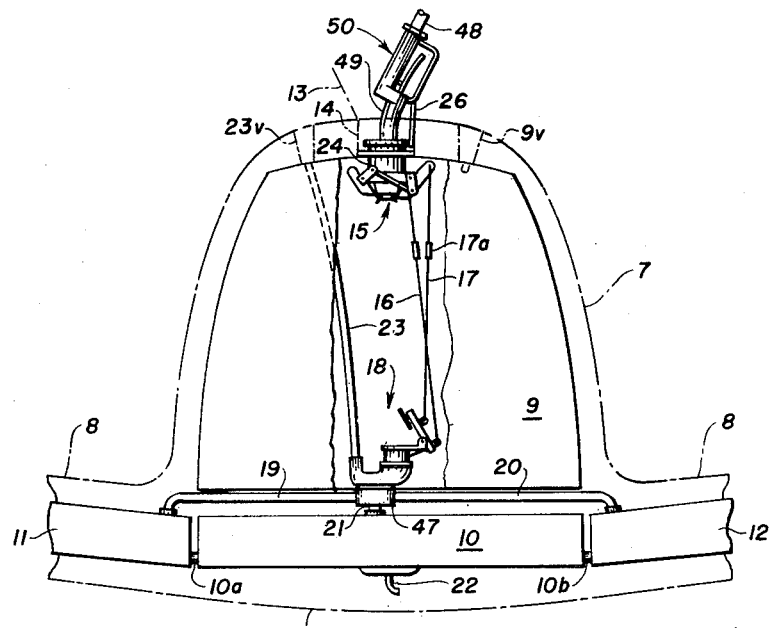
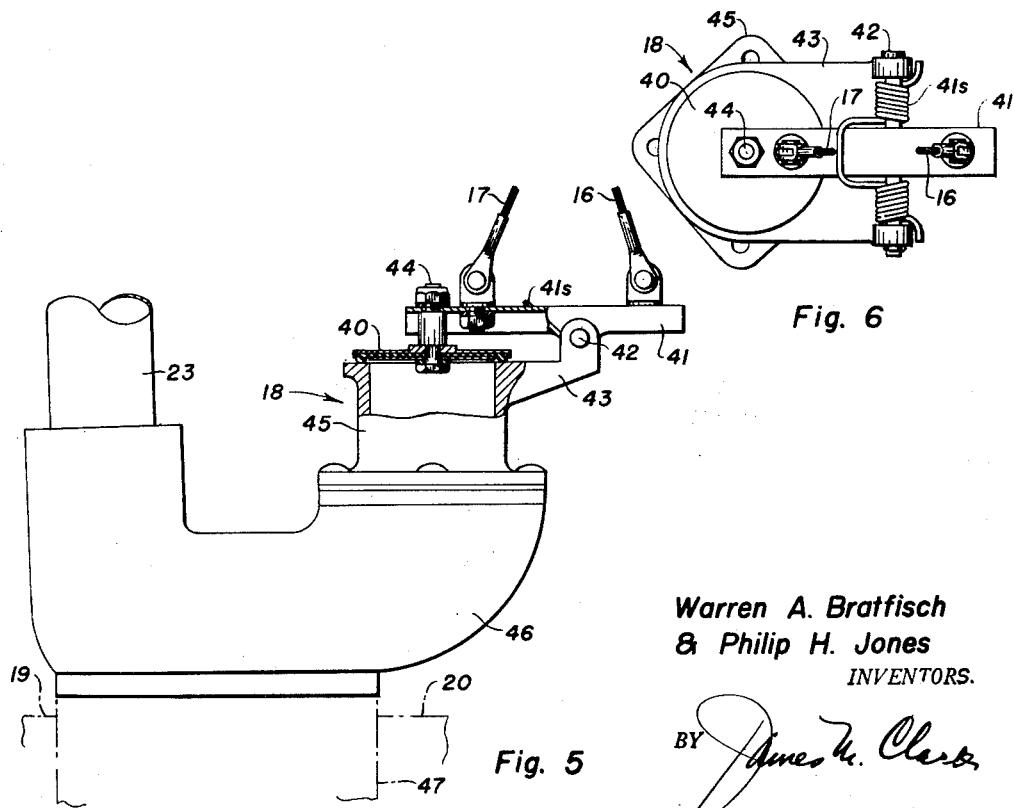

United States Patent Office 2,771,906
Patented Nov. 27, 1956

2,771,906

FLUID FILLING SYSTEM

Warren A. Bratfisch, Downey, and Philip H. Jones, Los Angeles, Calif., assignors to North American Aviation, Inc.

Application March 18, 1952, Serial No. 277,322

8 Claims. (Cl. 137—575)

The present invention relates generally to fluid systems and more particularly to improvements in the filling of interconnected storage tanks for aircraft.

In the design of modern aircraft fuel systems it is generally necessary to provide a plurality of tanks for the storage of fuel. In the case of high performance jet fighter aircraft, it is usually necessary to provide one or more tanks within the fuselage as well as within the wings. Due to the different shapes and relative positions of these tanks, it is desirable to closely control the flow between the tanks and from the tanks to the power plant, and in order to avoid undue stressing of the tanks and the aircraft, as well as to prevent excessive shift in the center of gravity of the aircraft it is essential that fluid flow between the several tanks be restricted or prevented during certain flight maneuvers.

In order to expedite the refueling of such aircraft, it has been found desirable to provide a single point fuel inlet, preferably to a central tank of the interconnected tank system from which the fuel is conducted to the additional tanks as the system is filled. It has been determined, however, that in high performance military aircraft direct interconnection of the several tanks frequently results in the development of excessive pressures in certain areas as a result of gravitational forces and the resultant combined head of fuel in the interconnected tanks. These conditions can give rise to dangerous situations wherein a storage tank might burst during high speed maneuvers such as in a pull-out at the bottom of a dive. Heretofore so-called "G" type valves responsive to gravitational forces have been used which isolate the several sections of the system when dangerous conditions develop. Considerable unsatisfactory performance has however been experienced in the use of these "G" type valves.

These and other objections to single point refueling systems for multiple interconnected storage tanks in aircraft have been eliminated by the present improved interconnected valve arrangement. Briefly stated, this invention relates to an improved arrangement in which a spring-biased filler door means disposed adjacent the top of an upper tank is interconnected with a spring-biased check valve disposed in the region of the bottom of the upper tank with equalizing connections to one or more lower tanks. The filler valve arrangement is such that as the nozzle of the filling hose is inserted to open the door unit against its spring pressure the check valve at the bottom of the tank is also opened such that the remaining lower tanks are each filled with fuel before the upper tank can be completely filled. When the filling nozzle is removed and the filler door unit again closes, it automatically closes the check valve adjacent the bottom of the tank to isolate and prevent interconnection between the upper tank and the lower group of tanks. This prevents excessive pressures being produced in any of the tanks as a result of gravitational forces due to the combined head of fuel or to tendencies of any of the tanks to burst under excessive pressures during high speed or other flight maneuvers. A further improvement resides in a novel crossed cable interconnection between the upper filler door and the lower check valve which automatically balances the tension load on the valve due to fuel sloshing within the upper tank and avoiding the valve movements which would result from the sloshing action of the fuel on a single cable passing through the tank.

It is accordingly a major object of the present invention to provide the improved filling arrangement for a plurality of aircraft fuel or other liquild tanks. It is a further object to provide an improved single point refueling system for a plurality of aircraft fuel tanks in which a deflectable filler unit is interconnected in a novel manner for the automatic opening of a valve as the filler nozzle is inserted against the filler unit. It is a further object to provide a valve and pipe arrangement for a plurality of fuel tanks in which the lower tanks are automatically interconnected for filling as the filler inlet of an upper tank is opened and the fluid filled therethrough.

It is a further object to provide in such an arrangement, automatic means for insuring the filling of the equalized lower tanks before the initial tank is filled, as well as to automatically close off the equalizing interconnection between the upper and lower tanks as soon as the upper tank has been filled and the filler nozzle is removed from the upper tank. It is a still further object of the present invention to provide an improved interconnection between the upper filler unit and the lower check valve to insure their concurrent opening and closing, as well as to prevent undesired opening of the check valve due to sloshing of the fuel within the tank resulting from flight maneuvers of the aircraft. It is also an object of the present invention to provide unique and improved relationship of the respective elements of the present arrangement as well as improvements in the details of the several parts.

Other objects and advantages of the present invention will become apparent to those skilled in the art after reading the following description, taken in conjunction with the accompanying drawings, forming a part hereof, in which:

Fig. 1 is a transverse view of an aircraft fuselage showing a plurality of fuselage and wing tanks to which a form of the present invention has been applied;

Fig. 2 is an enlarged partially sectional view looking in the same direction showing the operating portions of the upper filler unit and the lower valve;

Fig. 3 is a similar further enlarged view of the upper assembly;

Fig. 4 is a bottom view of the filler door assembly;

Fig. 5 is an elevational view of the base fitting and check valve at the bottom of the tank; and Fig. 6 is a plan view of the check valve unit.

Referring now to Fig. 1, the numeral 7 represents the outline of the transverse cross-section of the fuselage of a low wing aircraft having a fuselage bottom 7b from the sides of which extend the cantilever wings 8, of which only the root portions are shown. Within the fuselage 7, there is disposed an upper fuel tank 9 which has been partially broken away to more fully disclose the essential elements of the present invention. Beneath the upper fuel tank 9, there is disposed the center section fuel tank 10 on either side of which are located the laterally disposed wing fuel tanks 11 and 12. An access opening and door 13 is provided in the upper portion of the fuselage 7, around and beneath which is disposed a cylindrical filler neck 14 extending down to the top wall of the tank 9, having a conventional vent connection 9v. The filler door unit 15 is supported at the top wall of the tank 9 in alignment with the access door 13 and the filler neck 14, and is interconnected by the crossed cables 16 and 17 with the spring-biased check or flap valve 18 disposed at the bottom of the tank 9. The check valve 18 is mounted upon a base fitting 46 which is open to a further fitting 47 having an equalizing interconnection 19 to the wing tank 11, a connection 20 to the wing tank 12, and a further connection 21 opening downwardly into the central section tank 10. The latter is preferably provided with a suitable drain connection as at 22, interconnections at 10a and 10b, and a vent line 23 extends upwardly from the base fitting 46 to the vent opening 23v at the top of the fuselage 7. It will also be understood that the installation would be provided with suitable booster and other pumping means for delivering the contents of the fuel tanks to the power plant, as well as suitable means for controlling the sequential flow from each of the several tanks, this equipment not being illustrated as it does not comprise an essential portion of the present invention.

Referring more particularly to Figs. 2, 3 and 4, the filler door unit 15 comprises essentially a body portion 24 provided with an upper apertured flange 24f upon which is disposed the adapter assembly 25 having a similarly apertured flange 25f. The tank 9 is provided with an enlarged thickness boss portion 9b concentrically disposed around the opening in the top of the tank, and with the filler neck 14 and the access opening 13 in the fuselage 7. Within the boss 9b, there is provided a flange ring 9f provided with a plurality of tapped holes to receive the tap bolts 27, which when tightened embrace the gasketed flanges 24f and 25f, together with the lower flange of the filler neck 14, and the boss 9b of the tank 9, into a rigidly attached assembly. The adapter 25 is preferably provided with a cap element 26 which is normally held closed under spring pressure in the position in Fig. 3, but which is manually lifted when the filler nozzle 49 (see Fig. 2) is inserted through the filler opening.

A filler door assembly 28 having a pair of oppositely disposed upwardly extending flanges 28f is attached through these flanges to the lower portion of the inlet body 24. The door assembly 28 is also provided with a pair of downwardly extending oppositely disposed flanges or skirt portions 28s between which the door elements 29 and 30 are supported upon the pivots 31 and 32. The door element 29 is provided with a downwardly extending angular flange portion 29f and the opposite door element 30 is provided with a pair of downwardly extending flange portions 30f between which the cables 16 and 17 are attached on opposite sides of the axis of the pivot 32 upon which the door pivots or rotates. The doors 29 and 30 are biased into their closed positions, shown in the full lines in Figs. 2, 3 and 4, by the torque springs 33 and 34 coaxially disposed about the pivots 31 and 32, respectively. As shown in the transverse section through the double-acting doors 29 and 30 in Fig. 2, depending portions 24d of the body portion 24 serve to limit the upward movement of the doors 29 and 30 about their respective pivots. An arm 35 is attached to the pivot 31 and a like arm 36 is similarly attached to the pivot 32. An interconnecting link 39 is pivotally connected at one terminal at 37 to the arm 35, and at its opposite terminal by the pivotal connection 38 to the arm 36. This arm and interconnecting link assembly serves to cause both door elements to be opened and closed simultaneously by the insertion of the filler nozzle 49, or to be closed by the return action of the torque springs 33 and 34.

The lower check valve unit 18 is shown in Figs. 1 and 2 in its relationship to the filler door unit 15 and its details are supplemented by the showings in Figs. 5 and 6. The check valve 18 comprises a valve closure plate 40 supported from the arm 41 by the attachment bolt 44, the arm 41 being pivotally mounted upon the pivot 42 within the integral bracket 43 of the valve body portion 45, and being urged into its closed position by the torque or torsion spring 41s coaxially wound about the pivot pin 42. The lower terminals of the crossed cables 16 and 17 are connected to suitable fittings which are attached to the arm 41 on opposite sides of its pivot 42. Suitable turnbuckles, as indicated at 17a in Fig. 1, are provided in each of the cables 16 and 17 in order that they may be adjusted in length to provide for simultaneous action of the door assembly and the valve 18. The torsion spring 41s is wound such that it biases the valve closure plate 40 into its closed position and similarly the torsion springs 33 and 34 bias the door elements 29 and 30 into their closed positions also.

In order to fill all of the tanks in the fuel system, the access door 13 (see Fig. 1) is initially opened and the cap 26 on the filler unit 15 is also opened. This cap plate is preferably retained within the filler body and is urged in its closed position into intimate sealing contact with the upper portion of the valve body by suitable tensioning means which have not been shown. As the nozzle 49 on the hose 48, provided with the nozzle valve 50, is forced downwardly against the double-acting door elements 29 and 30 as indicated in Fig. 2, these doors are deflected downwardly into the broken line position such that opening of the nozzle valve 50 permits flow of fuel into the interior of the upper tank 9. As the door elements 29 and 30 are rocked about their respective pivots into their opened positions, the cables 16 and 17 which are pivotally connected to the door element 30 impart similar but opposite pivotation to the arm 41 upon which the valve plate closure 40 of the check valve 18 is mounted. When the door element 30 is pushed downwardly by the nozzle 49, as viewed in Fig. 2, and is rotated in the counterclockwise direction about the axis of its pivot 32, the cable 17 is tensioned and the remaining cable 16 is temporarily relaxed.

This causes simultaneous opening of the check valve 18 and when the inflowing fuel fills the bottom of the tank 9 and rises to the elevation of the opening in the check valve body 18, it flows through the body portion 45 into the base fitting 46 and the equalizing fitting 47, and thence through the lines 19, 20 and 21 to the respective tanks 11, 12, and 10. Accordingly, it is not possible to fill the upper tank 9 until the tanks 10, 11 and 12 have initially been filled and the level of the fuel rises above the open check valve 18. As the fuel level continues to rise within the upper tank 9, the filling operation may be stopped at any predetermined level and upon withdrawal of the nozzle 49 the door elements 29 and 30 are again permitted to rotate together into their closed positions in which they impart similar closing movement to the valve closure plate 40 of the lower check valve 18. As the check valve 18 is closed, the interconnection between the lower tanks 10, 11 and 12, and the upper tank 9 is closed, or removed, and any excessive pressures which may be developed in the upper portion of the system cannot be transmitted to the lower series of tanks. As the door element 30 rotates in the clockwise direction about its pivot 32 back into its closed position, the cable 16 is tensioned and the opposite cable 17 is temporarily relaxed. While the check valve 18 is closed, however, the lines 19, 20 and 21 which were previously utilized for filling the lower series of tanks now serve also as vent connections as these tanks may be depleted and the common vent connection 23 is effective for all of these lower storage tanks.

After the filler nozzle 49 has been withdrawn from the filler neck, the door members 29 and 30 return to their normal closed position, the cables returning to the original rigging tension and permitting the valve plate 40 of the check valve 18 to be reseated under the urging of its spring 41s. This arrangement of the double cables 16 and 17 which are arranged crosswise to rotate the elements of the two separate door and valve units in opposite directions (but to be simultaneously opened and simultaneously closed serves to automatically interconnect the tanks in the system while being filled but to completely isolate the individual tanks after the filling operation has been completed. The arrangement of the cross cables and interconnected door and valve units also avoids accumulative head effect which would normally be encountered in a directly interconnected refueling system. It will also be noted that the use of the two cables in the arrangement which has been disclosed serves to balance the tension loads on the valve plate of the check valve 18 from fuel sloshing and accordingly avoids any undesired movements of the valve plate 40 which might result from the surging or sloshing action of the fuel within the tank 9 in the event a single cable were to pass through this tank.

Other forms and modifications, which will occur to those skilled in the art after reading the foregoing description, are intended to come within the scope and spirit of this invention as more particularly set forth in the appended claims.

We claim:

1. In aircraft, a plurality of storage tanks, one of said tanks disposed above the elevation of the remaining tanks, conduit means interconnecting the bottom of said upper tank with said remaining tanks for permitting fluid flow from said upper tank to said remaining tanks, spring-biased valve means for closing the said conduit means interconnection from said upper tank to said remaining tanks, a filler opening associated with the upper portion of said upper tank, a door member hingedly supported upon said upper tank within said filler opening, resilient means connected to said door member urging said door member into its closed position with respect to said filler opening, a pair of tension elements operatively connecting said door member with said spring-biased valve means in such manner that insertion of a filling nozzle within said filler opening and hinging of said member imparts opening of said door member and said spring-biased valve means and provides fluid interconnection of said upper and lower tanks for the filling thereof through said filler opening.

2. In a fluid storage system, a storage tank having separate normally closed inlet and outlet openings through the walls thereof, a spring-biased valve controlling the outlet opening of said tank, filler-actuated means pivotally mounted adjacent said inlet opening, resilient means biasing said filler-actuated means into the normal position in which it closes said inlet opening, and a pair of flexible tension elements interconnecting said filler-actuated means and said spring-biased valve for simultaneous opening and closing movements, the said tension elements cross connected to said valve and to said filler-actuated means in such manner that fluid movement within said tank against said tension elements in the normally closed condition of said filler-actuated means and said spring-biased valve creates substantially equal tension in each said tension element to prevent undesired opening movement of said spring-biased outlet valve.

3. In a fuel system, a tank having openings through the upper and lower walls thereof, a spring-biased valve having a pivotally mounted element controlling the opening through a lower wall of said tank, filler-actuated means pivotally mounted upon said tank adjacent said upper opening, and a pair of crossed cables interconnecting said filler-actuated means and said spring-biased valve element for simultaneous opening and closing movements, the said crossed cables connected to said valve element and to said filler-actuated means in such manner on opposite sides of the respective pivotal mountings thereof that sloshing movement of fuel within said tank against said cables creates substantially equal tension in each cable to prevent undesired opening of said spring-biased valve.

4. In an aircraft fluid storage system, a storage tank having openings through the upper and lower portions thereof, a spring-biased valve controlling the opening through a lower portion of said tank, said valve having a pivotally mounted element, filler-actuated door means pivotally mounted adjacent said upper opening, a pair of crossed cables interconnecting said filler-actuated door means and said spring-biased valve for simultaneous opening and closing movements of said valve, the said crossed cables connected to said valve element and to said filler-actuated door means at each side of the respective pivotal mountings of each whereby fluid movement within said tank against said cables creates substantially equal tension in each cable to prevent undesired opening of said spring-biased valve, and insertion of a filler means into said tank upper opening moving said door means imparts opening movement to said valve by said cross cable connection.

5. In a fuel system, a first tank having a filler inlet adjacent the top of said tank, said tank having a normally closed valved outlet adjacent the bottom of said tank, a second tank disposed beneath said first tank and in communication therewith through said normally closed valved outlet, a closure member pivotally mounted within the filler inlet of said first tank, resilient means engaging said closure member for urging said closure member into a blocking position in which it closes said filler inlet and prevents insertion of a filler nozzle through said filler inlet, tie means interconnecting said closure member with said valve outlet for concurrent opening and closing of said inlet and outlet of said first tank, said closure member arranged in such manner that engagement by a filler nose nozzle inserted into said filler inlet overcomes said resilient means and causes concurrent opening of both said filler inlet and said valved outlet whereby said second tank is caused to be completely filled through said open valved outlet prior to the filling of said first tank and upon withdrawal of said filler hose nozzle said resilient means closes both said inlet and said valved outlet thereby isolating the fluid from within either tank from the fluid in the other such that pressures developed during maneuvers of the aircraft are not transmitted from one tank to the others.

6. In a fuel system for aircraft, a first tank having a filler inlet, a second tank disposed at a lower elevation than said first tank, said first tank having a normally closed outlet valve in fluid communication with said second tank, a pair of double-acting door elements pivotally mounted upon said first tank disposed within the filler inlet of said first tank, said door elements spring-biased into a normally closed relationship with respect to said filler inlet, flexible tensioning elements operatively interconnecting said door elements with said outlet valve arranged upon engagement of a filler nozzle with either of said door elements to transmit opening movement through said flexible tensioning elements to said outlet valve for permitting fuel flow from said first tank to said second tank, said arrangement being such that disengagement of said filler nozzle from said door elements permits concurrent closing of said door elements by said spring biasing and closing of said outlet valve for the isolation of the fluid in said first tank from the fluid in the said second tank, said flexible tensioning elements disposed within the fuel in said first tank arranged such that forces imposed upon said tensioning elements developed by surging movements of the fuel in said tank are effectively equalized and said forces tending toward inadvertent opening of said door elements and said outlet valve are opposed and neutralized.

7. In a single point fueling system for aircraft, a first tank, a second tank disposed below said first tank, outlet fitting means interconnecting the bottom of said first tank with an upper portion of said second tank for permitting fluid flow from said first tank to said lower second tank, valve means for closing the said outlet fitting, interconnection means from said first tank to said second lower tank, a filler opening associated with said first tank, a pivotally mounted closure member disposed within said filler opening, said closure member spring-biased to a position in which it closes said filler opening, tie elements operatively connecting said closure member with said outlet valve means in such manner that insertion of a filling means within said filler opening and engagement with said closure member causes concurrent opening of said closure member and said outlet valve means, and removal of the filling means causes concurrent closing of both said filler opening member and said outlet valve means for the effective isolation of the fluid within said first tank from the fluid within said second tank.

8. In a liquid storage system, a first tank having a filler inlet, a second tank disposed beneath said first tank, said first tank having a normally closed valved outlet in communication with said second tank, a normally closed deflectable door element pivotally supported within the filler inlet of said first tank, said door element spring-biased into a normally closed relationship with respect to said filler inlet, a pair of flexible tie elements operatively connected to said door element and to said valve outlet arranged such that upon engagement of said door element by a filler nozzle inserted into said filler inlet pivotal deflection is imparted to said door element for the opening of said filler inlet and said valved outlet, whereby the filling of both said tanks is permitted through the single filler inlet of said first tank, and closing of said filler inlet by said door element upon withdrawal of the filler nozzle automatically insolates the liquid contents of each tank from the other tank such that undesired pressures developed during operation of the storage system are not transmitted from either said tank to the other.

References Cited in the file of this patent

UNITED STATES PATENTS

| Number | Name | Date |
|---|---|---|
| 797,384 | Thurston | Aug. 15, 1905 |
| 1,102,971 | Williams | July 7, 1914 |
| 1,238,622 | Bacon | Aug. 28, 1917 |
| 1,361,614 | Powers | Dec. 7, 1920 |
| 1,396,394 | Barrett | Nov. 8, 1921 |
| 1,458,064 | Kaushlan | June 5, 1923 |
| 1,741,320 | Lee et al. | Dec. 31, 1929 |
| 1,776,877 | Yonkese | Sept. 30, 1930 |
| 1,793,777 | Condon | Feb. 24, 1931 |
| 1,833,150 | Beechlyn et al. | Nov. 24, 1931 |
| 1,990,605 | Johnson | Feb. 12, 1935 |
| 2,161,060 | Kelsey | June 6, 1939 |
| 2,561,836 | Anderson | July 24, 1951 |